(12) United States Patent
Bornazyan

(10) Patent No.: US 8,781,429 B2
(45) Date of Patent: Jul. 15, 2014

(54) ORDERED ELECTROMAGNETIC INTERFERENCE CANCELLATION

(71) Applicant: Exelis Inc., McLean, VA (US)

(72) Inventor: Gevork George Bornazyan, Sun Valley, CA (US)

(73) Assignee: Exelis Inc., McLean, VA (US)

(*) Notice: Subject to any disclaimer, the term of this patent is extended or adjusted under 35 U.S.C. 154(b) by 0 days.

(21) Appl. No.: 13/647,496

(22) Filed: Oct. 9, 2012

(65) Prior Publication Data

US 2014/0099908 A1 Apr. 10, 2014

(51) Int. Cl.
*H04B 1/10* (2006.01)

(52) U.S. Cl.
USPC ............. 455/296; 455/278.1; 455/232.1; 455/233.1; 455/276.1; 455/67.13; 375/346

(58) Field of Classification Search
CPC ................................. H04B 1/30; H04B 1/123
USPC ............. 455/296, 278.1, 232.1, 233.1, 276.1, 455/67.13; 375/346
See application file for complete search history.

(56) References Cited

U.S. PATENT DOCUMENTS

| | | | |
|---|---|---|---|
| 4,893,350 A | 1/1990 | Minamisono et al. | |
| 6,385,435 B1 * | 5/2002 | Lee ................................. | 455/24 |
| 7,729,431 B2 * | 6/2010 | Gebara et al. ................. | 375/259 |
| 8,249,540 B1 * | 8/2012 | Gupta et al. ................... | 455/296 |
| 2004/0042569 A1 | 3/2004 | Casabona et al. | |
| 2005/0058230 A1 | 3/2005 | Thomas et al. | |
| 2011/0319044 A1 | 12/2011 | Bornazyan | |

OTHER PUBLICATIONS

Search Report in corresponding European Application No. EP13187704.5, dated Jan. 29, 2014.

* cited by examiner

*Primary Examiner* — Sanh Phu
(74) *Attorney, Agent, or Firm* — Edell, Shapiro & Finnan, LLC

(57) ABSTRACT

Progressive cancellation of electromagnetic interference (EMI) is achieved by establishing a canceller stage processing order in a receiver feed circuit. Such a processing order may be one that progressively narrows an interference analysis bandwidth around desired target signal and optimizes gain-bandwidth characteristics of a cancellation loop in each canceller stage accordingly. A cancellation signal generated by each canceller stage is adaptively controlled without disturbing the stability of the cancellation loop. By doing so, the residual interference-to-noise ratio at each adaptive canceller stage is optimized independently from the closed cancellation loop control of the other canceller stages resulting in improved interference cancellation in the receiver feed circuit.

20 Claims, 5 Drawing Sheets

ORDERED ELECTROMAGNETIC INTERFERENCE CANCELLATION

FIELD OF THE INVENTION

The present general inventive concept relates to interference cancellation by which unwanted signals are minimized or eliminated in radio receivers.

BACKGROUND

Electromagnetic interference (EMI) in radio-frequency (RF) signals occurs where an RF receiver operating to receive a target signal is within range of an RF transmitter transmitting signals that overlap in frequency with the target signal. In certain cases, such overlap is intentional, such as when radio jamming equipment is deployed to hinder normal radio operations. Such radio jammers may also be integrated in a single receiving system as part of a security strategy. For example, jamming equipment may be installed with other radio equipment on a single platform, such as an aircraft, to prevent unauthorized parties within radio range of the aircraft from intercepting secure communications. Cancelling or otherwise ameliorating EMI is thus essential in many RF receiving scenarios. Accordingly, there is an ongoing pursuit of EMI cancellation techniques that provide greater interference rejection.

SUMMARY

The present general inventive concept enhances the degree of EMI cancellation by way of ordered cancellation processing. One such ordering progressively narrows the interference detection bandwidth over multiple processing stages around a desired signal.

Certain aspects of the present general inventive concept make available an interference reference circuit to provide an interference reference signal indicative of the EMI. A plurality of canceller stages generate cancellation signals from respective reference signals provided thereto. The canceller stages are configured to evaluate the reference signals over respective analysis bandwidths that encompass a frequency band of the target signal by an amount other than that of other canceller stages. A receiver feed circuit is coupled to the canceller stages to apply the cancellation signals to an incoming RF signal in a prescribed processing order, where the incoming signal is a combination of the target signal and an impinging EMI signal. The application of the cancellation signals in the receiver processing path generates residue signals, each of which is provided from one canceller stage to another in accordance with the processing order. The canceller stages are coupled to the receiver feed circuit such that an initial one of the reference signals evaluated in the processing order is the interference reference signal. A receiver is coupled to the receiver feed circuit to generate a data signal from a final one of the residue signals in the processing order.

These and other objects, features and advantages of the present general inventive concept will be apparent from the following detailed description of illustrative embodiments thereof, which is to be read in connection with the accompanying drawings.

DETAILED DESCRIPTION

Figure 1:
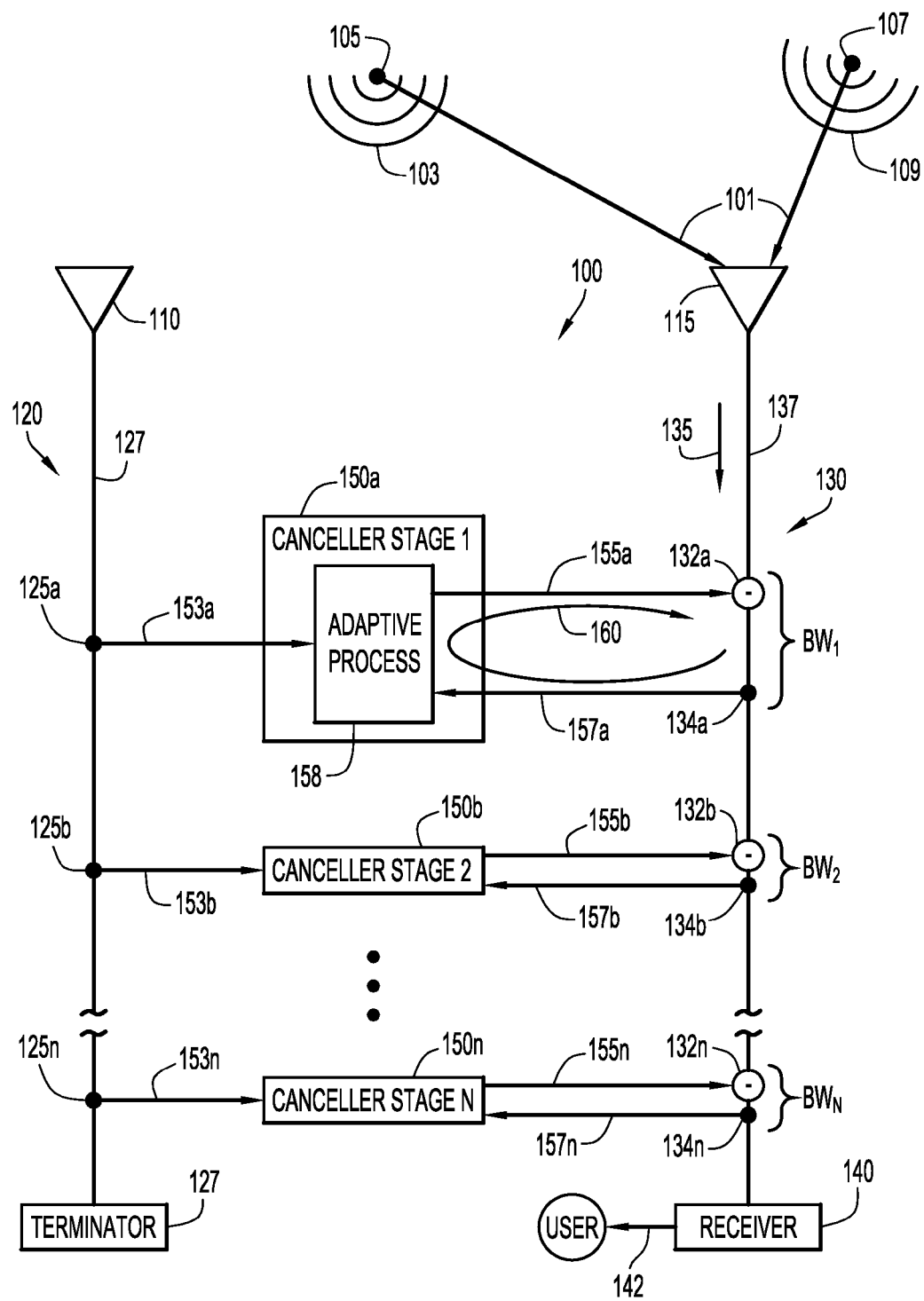
FIG. 1 is a schematic block diagram of an interference cancellation system by which the present general inventive concept can be embodied.

The present general inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary, when used herein, is intended to mean "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 is a simplified schematic block diagram of an exemplary interference cancelling system (ICS) 100 by which the present invention may be embodied. ICS 100 may include a reference antenna 110 to intercept a signal, referred to herein as interference signal 103, from an interference signal source 105, such as a radio transmitter. Reference antenna 110 may be positioned in close proximity to the interference source transmitting antenna or a sample of interference signal 103 may be acquired by way of a direct tap in the interference source transmitter antenna feed circuit on the same platform as ICS 100 (not illustrated). Reference antenna 110 may be coupled to an interference reference circuit 120 comprising a signal conduit 127, a plurality of signal tap couplers 125a-125n, representatively referred to herein as signal tap coupler(s) 125, and, optionally, a terminator 127. Reference circuit 120 may be configured to provide interference reference signals 153a-153n, representatively referred to herein as reference signal(s) 153, from interference signal 103 for purposes of cancelling or otherwise attenuating interference in signals of interest.

ICS 100 includes a receiver antenna 115 to intercept a signal, referred to herein as a target signal 109, from a remote transmitter 107. Receiver antenna 115 may be coupled to a receiver feed circuit 130 to provide target signal 109 to receiver 140. However, because target signal 109 may be corrupted by interference signal 103, target signal 109 must be extracted from an incoming signal 101, i.e., the combination of target signal 109 and interference signal 103.

Receiver feed circuit 130 may include a signal conduit 137 and one or more signal injection couplers 132a-132n, representatively referred to herein as injection coupler(s) 132, by which cancellation signals 155a-155n, representatively referred to herein as cancellation signal(s) 155, are introduced into the receiver feed circuit 130. Additionally, receiver feed circuit 130 may include one or more signal tap couplers 134a-134n, representatively referred to herein as signal tap coupler(s) 134, coupled to signal conduit 137, by which residual signals 157a-157n, representatively referred to herein as residual signal(s) 157, are extracted from receiver feed circuit 130. Receiver feed circuit 130 may be terminated in a receiver circuit 140 that generates a data signal 142 from target signal 109 as obtained from incoming signal 101.

ICS 100 may include a plurality of canceller stages 150a-150n, representatively referred to herein as canceller stage(s) 150, coupled to interference reference circuit 120 and receiver feed circuit 130. Each canceller stage 150 may be configured to analyze signals provided thereto, e.g., reference signal 153 and residue signal 157, and to generate cancellation signal 155 in accordance with the analysis. The cancellation signal 155 of one canceller stage 150 is applied to incoming signal 101 through a signal injection coupler 132 and the remaining signal, i.e., residue signal 157, is passed onto subsequent canceller stages 150. Such sequential processing over receiver feed circuit 130 defines therein a receiver processing path 135. Through receiver processing path 135, interference may be cancelled in stages, each canceller stage 150 removing an assigned portion of interference such that, at the terminal end of receiver processing path 135, interference signal 103 is significantly removed from incoming signal 101 thereby leaving a substantially clear target signal 109 from which receiver 140 can generate data signal 142.

Each canceller stage 150 may include an adaptive processor 158 to perform signal analysis and to generate cancellation signal 155. Adaptive processor 158 may examine characteristics of reference signal 153 and residue signal 157, such as by correlation between the two signals within an assigned band of frequencies, referred to as an analysis band. In certain embodiments, the analysis band of each canceller stage 150 encompasses target signal 109 by an analysis bandwidth BW that is other than the analysis bandwidth BW of other canceller stages 150. When so embodied, each canceller stage 150 generates a cancellation signal 155 that removes a portion of interference that corresponds to the analysis bandwidth BW. Canceller stages 150 are coupled to receiver feed circuit 130 to define the analysis bandwidth BW processing order in the receiver processing path 135, i.e., $BW_1$ followed by $BW_2$, etc., through which the interference signal is removed.

Adaptive processor 158 may dynamically adjust processing variables to account for fluctuations in interference signal 103 and/or incoming signal 101. That is, as conditions external to ICS 100 change in a manner that affects one or more of interference reference signal 153 and residue signal 157, adaptive processor 158 detects such change and modifies cancellation signal 155 to maintain maximum cancellation. Such may be achieved by constructing a feedback loop, referred to herein as a cancellation loop 160, in each canceller stage 150. That is, cancellation signal 155 may be provided to signal injection coupler 132 resulting in a corresponding portion of interference being cancelled from incoming signal 101. The effect of such cancellation is carried in residue signal 157, which is fed back to adaptive processor 158 through signal tap coupler 134. Processing variables in adaptive processor 158 from which cancellation signal 155 is generated can be dynamically altered based on characteristics of residue signal 157 to achieve optimal interference cancellation by canceller stage 150. Each canceller stage 150 may operate in accordance with its own processing variables and each canceller stage 150 may operate independently in accordance with its own cancellation loop 160. However, operational stability in each feedback loop must be maintained, as discussed further below.

The ordinarily skilled artisan will recognize various applications in which the present invention can be embodied. As such, the signal sources illustrated and described as interference source 105 and corresponding reference antenna 110, and target signal source 107 and receiver antenna 115 may be replaced by equipment suitable to the application. The adaptive signal processing in each canceller stage 150 and the order in which canceller stages 150 are provided in receiver processing path 135 may modified accordingly.

Figure 2:
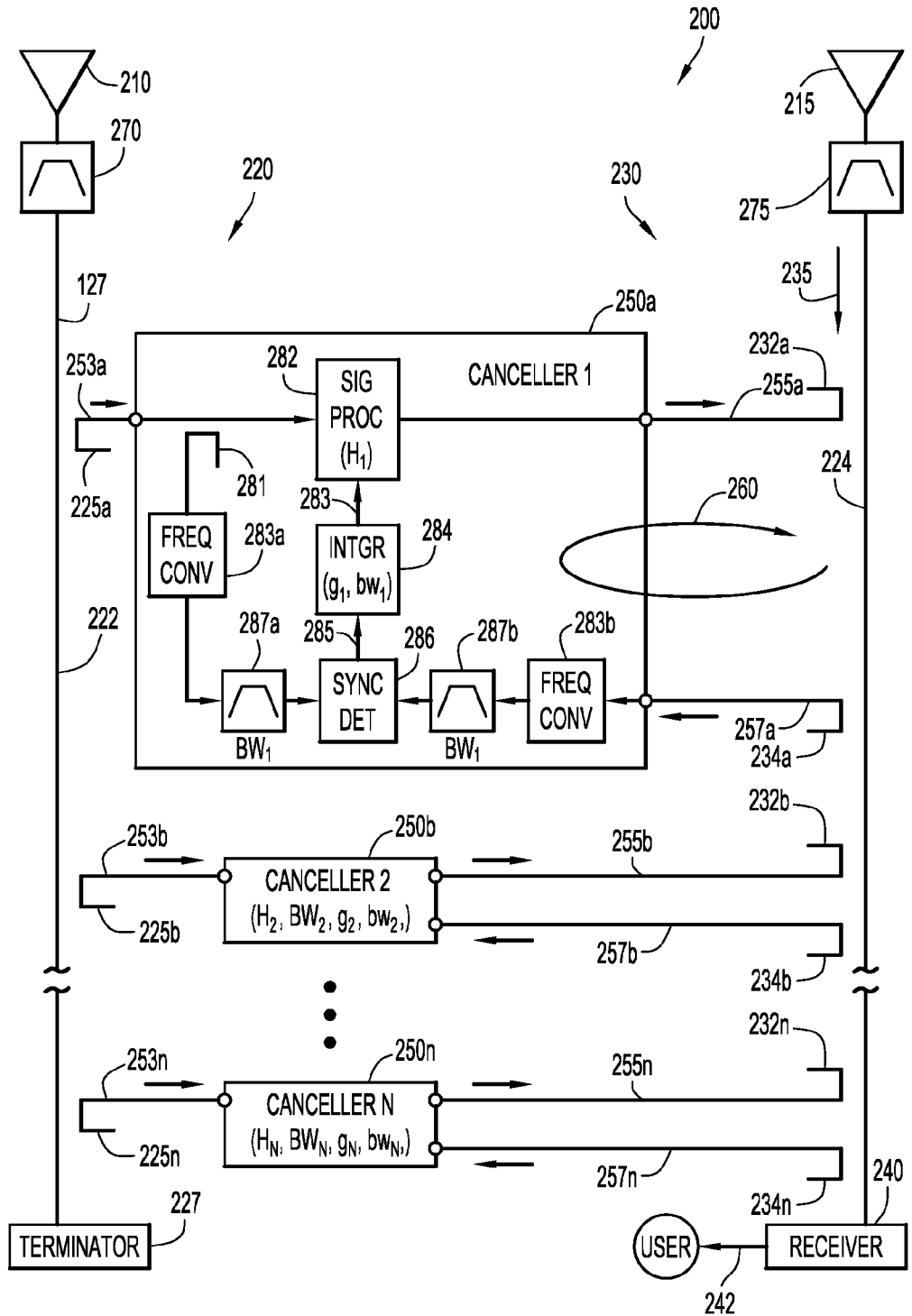
FIG. 2 is a schematic block diagram of a progressively narrowing interference and noise cancelling system by which the present general inventive concept can be embodied.

FIG. 2 is a schematic block diagram of a progressively narrowing bandwidth cancellation (PNBC) system 200 embodiment of the present invention. PNBC system 200 includes an interference reference circuit 220 including a reference antenna 210, transmission line 222 and terminator 227. Transmission line 222 may include a plurality of signal tap couplers 225a-225n, representatively referred to herein as signal tap coupler(s) 225, by which interference reference signals 253a-253n, representatively referred to herein as reference signal(s) 253, are provided to adaptive canceller stages 250a-250n, representatively referred to herein canceller stage(s) 250. PNBC system 200 includes further receiver feed circuit 230 including a receiver antenna 215 to intercept an incoming signal, a transmission line 224 and receiver circuit 240 that generates data signal 242. Receiver feed circuit 230 may include one or more signal injection couplers 232a-232n, representatively referred to herein as signal injection coupler(s) 232, by which cancellation signals 255a-255n, representatively referred to herein as cancellation signal(s) 255, are introduced into receiver processing path 235. Additionally, receiver feed circuit 230 may include one or more signal tap couplers 234a-234n, representatively referred to herein as signal tap coupler(s) 234, by which residual signals 257a-257n, representatively referred to herein as residual signal(s) 257, are extracted from transmission line 224.

Canceller stages 250 may be configured to generate cancellation signals 255 in accordance with analysis of respective bands of frequencies $BW_1$-$BW_N$, representatively referred to herein as analysis bandwidth(s) BW. Accordingly, each canceller stage 250 may include a set of filters 287a, 287b, representatively referred to herein as filter(s) 287, to limit the content of reference signal 253 and residue signal 257, and therewith the generation of cancellation signal 255, to a predetermined analysis band. The PNBC architecture defines receiver processor path 235 in a progressively narrowing analysis bandwidth processing order $BW_1 > BW_2 > \ldots > BW_N$ around the target signal.

Each of the canceller stages 250 may include an adaptive processor comprising a synchronous detector 286, an integrator 284 having a variable gain g and variable bandwidth bw coupled to the outputs of the synchronous detector 286, and a signal controller 282 coupled to the output of the integrator 284. The signal tap coupler 234, synchronous detector 286, integrator 284, signal processor 282 and signal injection coupler 232 form a cancellation loop 260 in which the gain g and bandwidth bw comprise the process variables by which cancellation signals 255 are optimized. Constraints on cancellation loop 260 must be met that maintain operational stability in the loop. In certain embodiments of the present invention, the gain-bandwidth product (GBP) of integrator 284 is constrained to a particular value in each canceller stage 250 that establishes such stability. When so embodied, the gain g of integrator 284 can be altered to meet some optimization criterion and as long as a corresponding modification to the bandwidth bw of integrator 284 is made, stability is maintained.

Synchronous detector 286 cross-correlates reference signal 253 with residue signal 257 and provides detector output signals that vary in accordance how well reference signal 253 and residue signal 257 are correlated. In certain embodiments, synchronous detector 286 is a quadrature phase detector having in-phase (I) and quadrature (Q) outputs, although only one output signal, i.e., error signal 285, is illustrated. It is to be understood that the term error is used solely to connote an indication of the extent to which processing variables in cancellation loop 260 are to be modified to meet the optimization criterion; the term is not meant to limit the present invention to the determination of errors, per se. Error signal 285 may be provided to adaptive integrator 284, which integrates the error signal 285 over a time interval or, equivalently, over a series of numerical sample sets, to increase the signal-to-noise ratio of the correlated signal.

As indicated above, gain g and bandwidth bw in integrator 284 are variable within the stability constraints of the GBP thereof. Thus, integration is performed on the incoming error signal 285 within analysis bandwidth BW at gain g and with resolution and dynamic range defined by bandwidth bw. The two variables bw and g are adaptively and dynamically modified as necessary to meet the optimization criterion, such as, for example, a minimum level of residue signal 257.

Integrator 284 generates an integrated error signal 283 and provides such to signal processor 282. Signal processor 282 is configured through hardware or a combination of hardware and software to generate cancellation signal 255 in accordance with a signal generation function H(t). In one implementation, H(t) inverts the reference signal 253 in accordance with characteristics of integrated error signal 283 to produce cancellation signal 255. Accordingly, cancellation signal 255 destructively interferes with the interference signal present in receiver feed circuit 230 at each canceller stage 250.

In certain embodiments of the present invention, additional components may be added to accommodate a frequency-tunable receiver 240. For example, tunable filters 270 and 275 may be introduced into the reference circuit 220 and receiver feed circuit 230, respectively. Tunable filters 270 and 275 may track a tuner (not illustrated) in receiver 240 to encompass a signal of interest, e.g., the target signal, by a frequency band that excludes neighboring signals. Additionally, each canceller stage 250 may include a set of frequency converters 283a-283b by which the target signal being sought by the tuned receiver is shifted as necessary into the analysis bandwidth BW of the canceller stage 250. Thus, the process variables in cancellation loop 260 and the corresponding stability criteria are unaffected by the receiver tuning.

Figure 3:
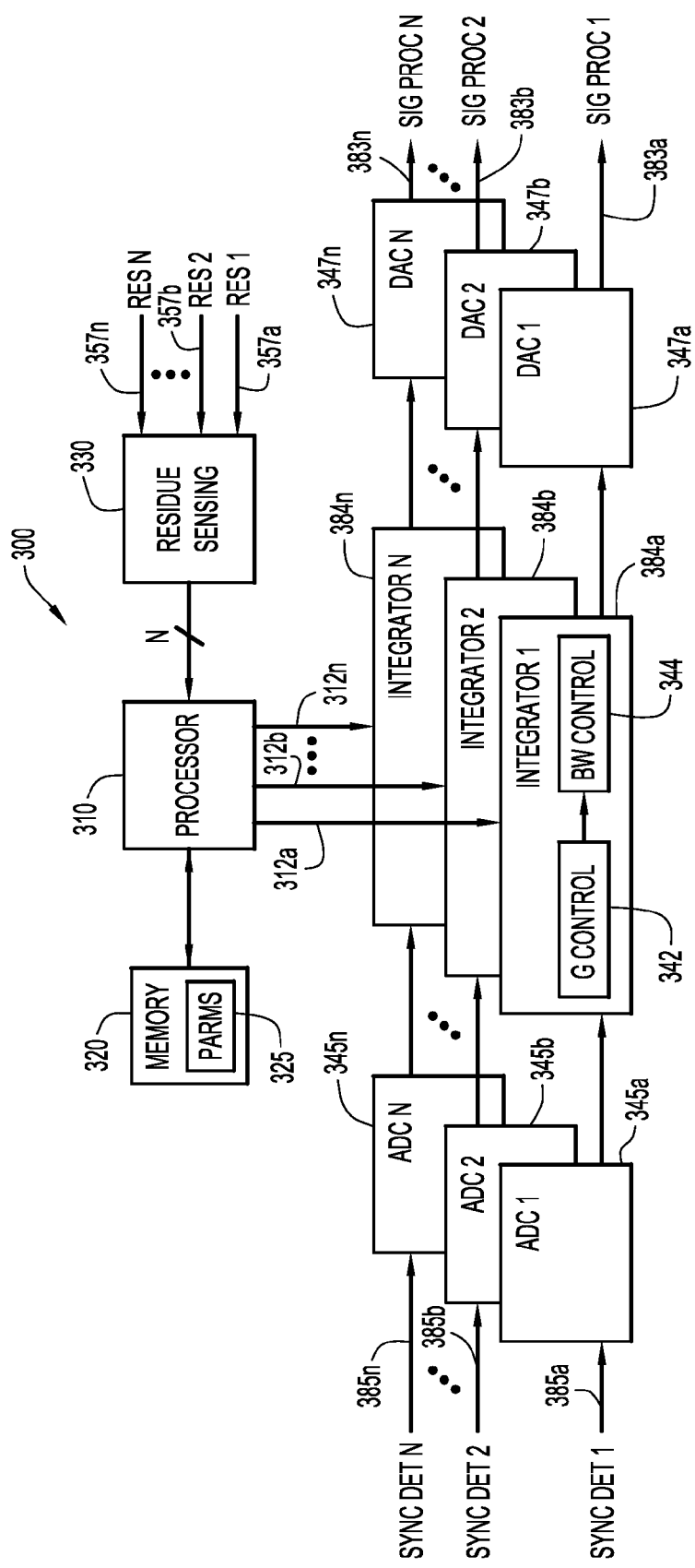
FIG. 3 is a schematic block diagram of an adaptive processor system by which the present general inventive concept can be embodied.

FIG. 3 is a schematic block diagram of an adaptive processor system 300 by which the present invention may be embodied. System 300 includes digital integrators 384a-384n, representatively referred to herein as digital integrator(s) 384. Each digital integrator 384 has associated therewith a corresponding analog-to-digital converter (ADC) 345a-345n, representatively referred to herein ADC(s) 345, and a corresponding digital-to-analog converter (DAC) 347a-347n, representatively referred to herein as DAC(s) 347. Each ADC 345 is communicatively coupled to a corresponding synchronous detector 286 and receives a corresponding error signal 385a-385n, representatively referred to herein as error signal(s) 385, therefrom. Each DAC 347 is communicatively coupled to a corresponding signal processor 282 to provide a corresponding integrated error signal 383a-383n, representatively referred to herein as integrated error signal(s) 383, thereto. Accordingly, each error signal 385 is converted into a digital signal, is integrated by integrator 384 and the digitally integrated error signal is converted into an analog signal. The ordinarily skilled artisan will recognize other system configurations that may be used in conjunction with the present invention without departing from the spirit and intended scope thereof.

Adaptive processor system 300 may include a processor 310, which may be realized by a suitable microprocessor, microcontroller, or the like. Processor 310 may be communicatively coupled to memory 320 in which, among other things, various control parameters 325 may be stored. Such parameters may include a GBP constant for each canceller 250 and default values for loop gain g and loop bandwidth bw for each canceller stage 250. Memory 320 may further store various sample values, as needed, for purposes of system control and signal processing. Additionally, memory may have stored therein processor instructions that, when executed by processor 310, implements such system control and signal processing.

Processor 310 may provide control signals 312a-312n, representatively referred to herein as control signal(s) 312, to respective integrators 384. Control signals 312 may establish the loop gain g in loop gain controller 342 and loop bandwidth bw in bandwidth controller 344. Digital signal samples from ADC 345 may be integrated over a number of sample cycles, e.g., by summation, as multiplied by gain g through gain controller 342 and as band-limited by bandwidth controller 344.

As illustrated in FIG. 3, residue signals 357a-357n, representatively referred to herein as residue signal(s) 357, are provided to residue signal sensor 330. Residue sensor 330 may convert residue signal 357 into a numerical value suitable for analysis and/or processing by processor 310. Such numerical residue values may be tracked, e.g., stored in memory 320 as successive data sets over several sampling cycles. Processor 310 may determine from such data sets whether a minimum value thereof has been obtained. If such a minimum value has been reached, indicating that maximum cancellation has been achieved, integration continues unchanged, i.e., with current gain g and bandwidth bw values in force. However, if residue signal 357 is not at a minimum value, new values for gain g and bandwidth bw may be calculated by processor 310 and continually altered until residue signal 357 is minimized.

Figure 4:
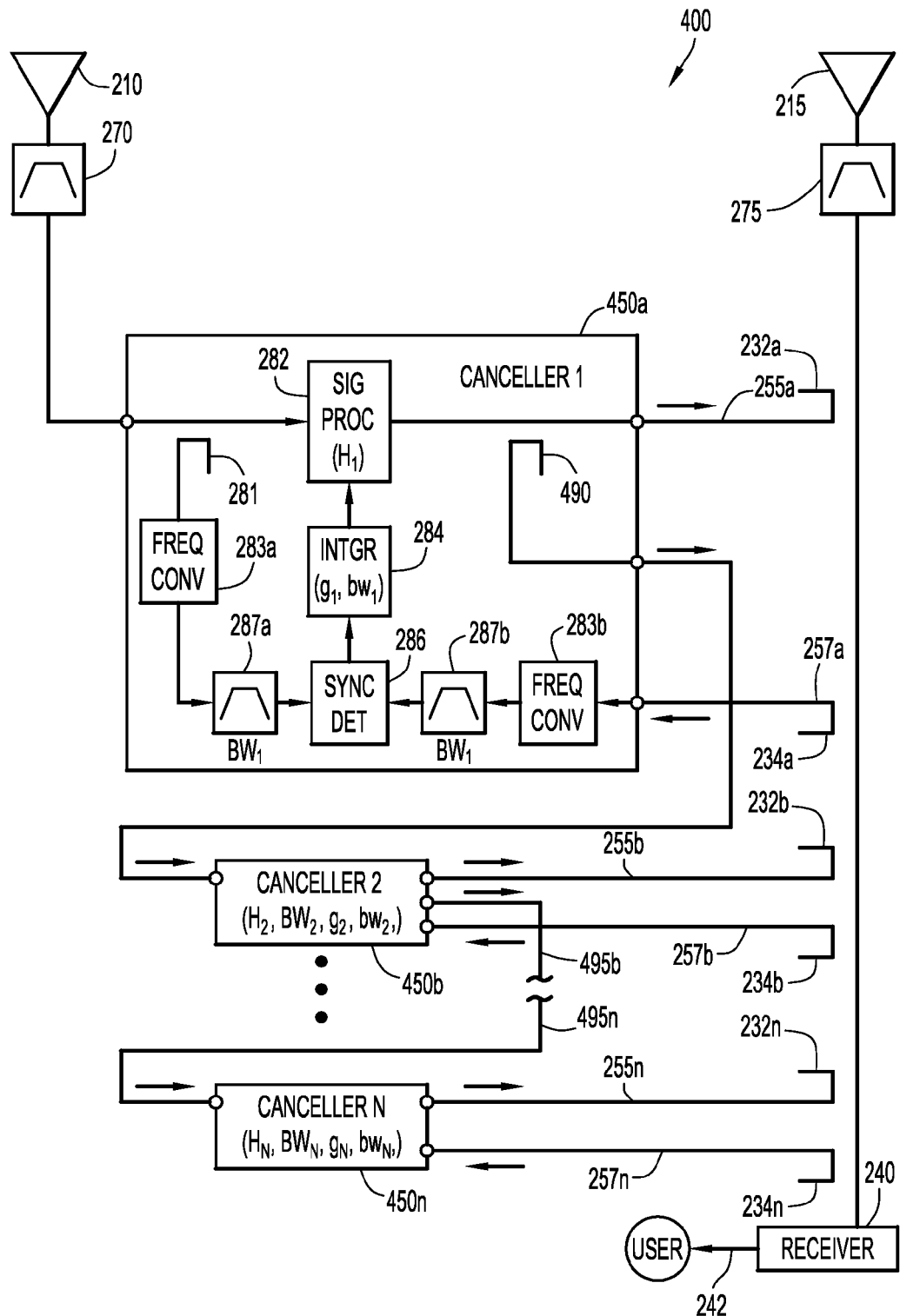
FIG. 4 is a schematic block diagram of another progressively narrowing interference and noise cancelling system by which the present general inventive concept can be embodied.

FIG. 4 is a schematic block diagram of an embodiment of a PNBC system 400. Like reference numerals in FIG. 4 as those in FIG. 2 refer to like components and repeated descriptions thereof will be omitted. Each canceller stage 450 in PNBC system 400 includes an additional signal tap coupler 490 by which cancellation signal 255 may be sampled. Cancellation signal 255 includes artifacts caused by, among other things, hardware components that carry out the processing in canceller stage 450. Providing the cancellation signal 255 from one canceller stage 450 as the reference signal to another canceller stage 450, such as via signal conduits 495a-495n, allows subsequent stages in the receiver processing path to account for the signal artifacts produced by earlier stages in the receiver processing path in the formation of later cancellation signals 255.

Figure 5:
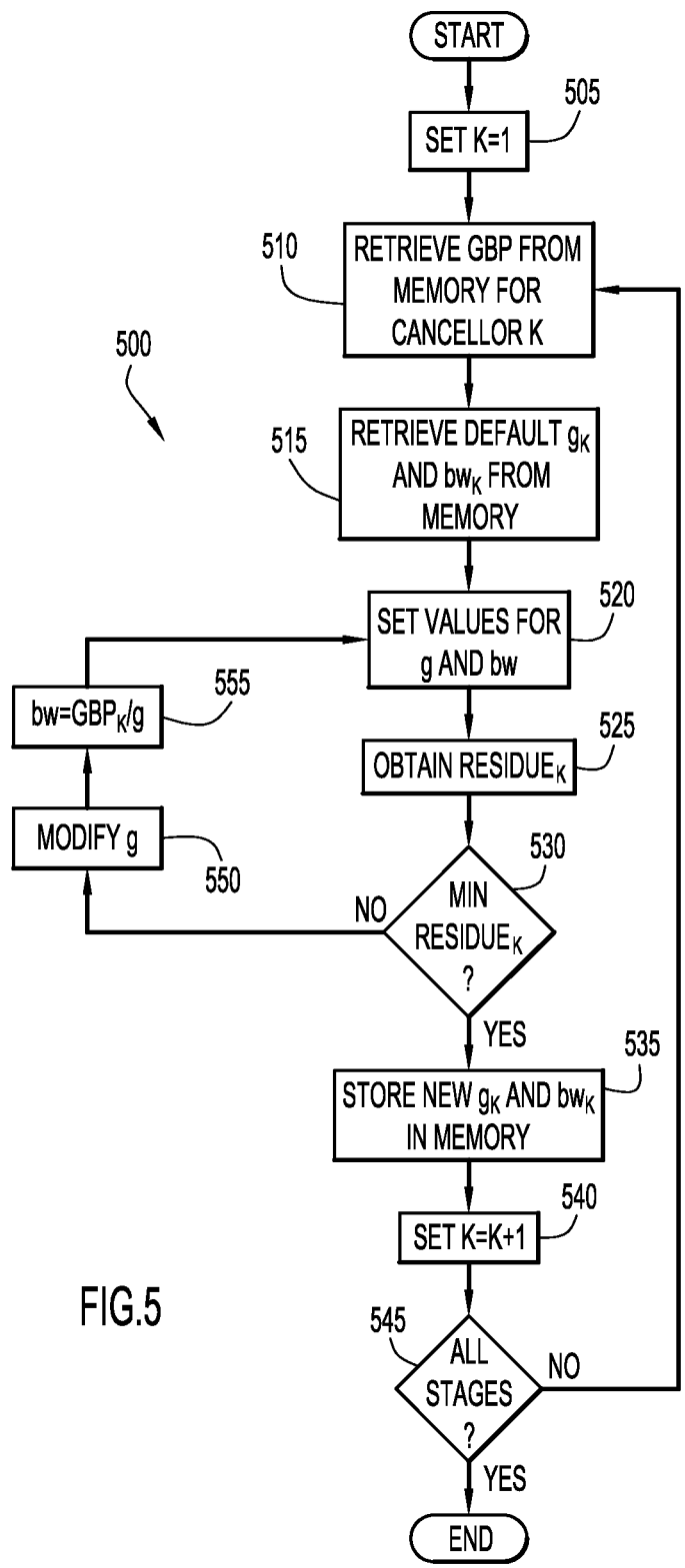
FIG. 5 is a flow diagram of an adaptive signal cancellation process by which the present general inventive concept can be embodied.

FIG. 5 is a flow diagram of an exemplary adaptive control process 500 by which the present invention may be embodied. In operation 505, an index k is initialized and, in operation 510, the k-th GBP constant is retrieved from, for example, memory 320. In operation 515, stored values of the k-th default loop gain g and default loop bandwidth bw is retrieved from memory 320 and assigned to corresponding control variables g and bw in operation 520. In operation 525, the k-th residue signal is obtained, and, in operation 520, it is determined whether the residue signal is minimized, such as through residue signal sensor 330. If the residue signal is at minimum, loop gain g and loop bandwidth bw is stored as the k-th gain g and k-th bandwidth bw in memory 320. In operations 540, index k is incremented and it is determined in operation 545 whether all canceller stages have been assessed. If not, process 500 is repeated at operation 510.

If, at operation 530, it is determined that the k-th residue signal is not at a minimum value, then the loop gain g is modified, i.e., increased or decreased, so as to minimize the residue signal. In operation 555, the loop bandwidth bw is set to $GBP_k/g$ so as to maintain stability in the cancellation loop, i.e., by way of the constant GBP for canceller k. Process 500 then repeats at operation 520, where the values of $bw_k$ and $g_k$ are set into the control loop.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
   an interference reference circuit configured to provide an interference reference signal indicative of electromagnetic interference impinging on a target signal;
   a plurality of canceller stages configured to generate respective cancellation signals from respective reference signals provided thereto, the canceller stages configured to evaluate the reference signals over respective analysis bandwidths, each of the analysis bandwidths encompassing a frequency band of the target signal by an amount other than that of other of the canceller stages;
   a receiver feed circuit coupled to the canceller stages and configured to apply the cancellation signals to an incoming signal comprising the target signal as impinged upon by the electromagnetic interference in a prescribed processing order in a receiver processing path, the application of the cancellation signals in the receiver processing path generating residue signals therein, the receiver feed circuit being constructed to provide each of the residue signals from one canceller stage to another in accordance with the processing order of the receiver processing path, the canceller stages being coupled to the receiver feed circuit such that an initial one of the reference signals evaluated in the processing order is the interference reference signal; and
   a receiver coupled to the receiver feed circuit and configured to generate a data signal from a final one of the residue signals in the receiver processing path.

2. The apparatus of claim 1, wherein the canceller stages are coupled to the receiver feed circuit in a progressively narrowing analysis bandwidth order to define therewith the prescribed order in which the cancellation signals are applied in the receiver processing path.

3. The apparatus of claim 2, wherein the canceller stages comprise respective control circuits and are coupled to the receiver feed circuit to form respective closed control loops having a gain bandwidth product establishing stability therein, bandwidth and gain in the gain bandwidth product being variable within the corresponding analysis bandwidths.

4. The apparatus of claim 3, wherein the control loop gains increase in the processing order with narrowing analysis bandwidths in the processing order.

5. The apparatus of claim 4, wherein each of the control circuits comprises:
   an error detector configured to generate an error signal from the reference signal and a corresponding one of the residue signals;
   a variable-gain/variable-bandwidth integrator coupled to the error detector and configured to integrate the error signal within the analysis bandwidth of the canceller stage; and
   a controller coupled to the integrator and configured to generate the cancellation signal in accordance with the integrated error signal.

6. The apparatus of claim 5 further comprising:
   a processor configured to adjust the control loop gains of the integrators to minimize the error signal in the corresponding analysis bandwidth and to adjust the control loop bandwidths in accordance with the adjusted gains to maintain the respective gain bandwidth products.

7. The apparatus of claim 4, wherein the receiver feed circuit includes a one or more tapping couplers and one or more injection couplers connected in series one to another in alternating order, the canceller stages being coupled to the tap ports and the injection ports in such that the respective residue signals generated at the cancellers are provided to both the canceller stage that generated the residue signal and the canceller stage next in the processing order.

8. The apparatus of claim 4, wherein the canceller stages are coupled to the interference reference circuit such that all of the reference signals are the interference reference signal.

9. The apparatus of claim 4, wherein the canceller stages are connected in cascade such that the cancellation signal of each of the canceller stages is provided as the reference signal to a next canceller stage in the processing order.

10. An apparatus comprising:
    a reference antenna configured to intercept an interference signal;
    a receiving antenna configured to intercept a target signal in the presence of the interference signal;
    a receiver feed circuit coupled to the receiving antenna and including a plurality of series-connected signal couplers;
    a plurality of canceller stages coupled to the signal couplers and configured to define a prescribed processing order that progressively cancels the interference signal from an incoming signal comprising the interference signal and the target signal, each of the canceller stages extracting a residue signal from one of the signal couplers and injecting a cancellation signal into another of the signal couplers, the cancellation signal being generated from the residual signal analyzed over a corresponding analysis bandwidth encompassing a frequency band of the target signal by an amount other than that of other of the canceller stages; and
    a receiver configured to generate a data signal from the residue signal of one of the canceller stages nearest thereto in the processing order.

11. The apparatus of claim 10, wherein the canceller stages are coupled to the receiver feed circuit in a progressively narrowing analysis bandwidth order to define therewith the prescribed order in which the cancellation signals are applied in the receiver processing path.

12. The apparatus of claim 11, wherein the canceller stages comprise respective control circuits and are coupled to the receiver feed circuit to form respective closed control loops having a gain bandwidth product establishing stability therein, bandwidth and gain in the gain bandwidth product being variable within the corresponding analysis bandwidths.

13. The apparatus of claim 12, wherein each of the control circuits comprises:
   an error detector configured to generate an error signal from a reference signal and a corresponding one of the residue signals;
   a variable-gain/variable-bandwidth integrator coupled to the error detector and configured to integrate the error signal within the analysis bandwidth of the canceller stage; and
   a controller coupled to the integrator and configured to generate the cancellation signal in accordance with the integrated error signal.

14. The apparatus of claim 13 further comprising:
   a processor configured to adjust the control loop gains of the integrators to minimize the error signal in the corresponding analysis bandwidth and to adjust the control loop bandwidths in accordance with the adjusted gains to maintain the respective gain bandwidth products.

15. The apparatus of claim 13, wherein the canceller stages are coupled to the reference antenna such that the reference signal of the canceller stages is the interference signal.

16. The apparatus of claim 13, wherein the canceller stages are connected in cascade such that the cancellation signal of each of the canceller stages is provided as the reference signal to a next canceller stage in the processing order.

17. A method comprising:
   configuring gain-bandwidth products for stable operation in respective control loops of respective canceller stages in an interference cancellation system;
   progressively attenuating interference in a target signal in a processing order defined by interconnection of the canceller stages;
   modifying gain in each of the control loops to maintain a minimum error between a corresponding residue signal and a corresponding reference signal indicative of the interference; and
   modifying the bandwidth in the control loops based on the modified gain in each of the control loops to maintain the gain-bandwidth products for stable operation.

18. The method of claim 17, further comprising:
   generating the residue signal at each of the canceller stages from the target signal having the interference therein attenuated by the canceller stages preceding in the processing order.

19. The method of claim 18, wherein progressively attenuating interference comprises:
   generating cancellation signals at each of the canceller stages per a progressively narrowing analysis bandwidth order as the processing order;
   applying the cancellation signals to the residue signal at each of the canceller stages.

20. The method of claim 19 further comprising:
   integrating the error between the residue signal and the reference signal within the analysis bandwidth and at the gain of the corresponding one of the canceller stages.

* * * * *